March 31, 1970   J. H. McELHANEY ET AL   3,503,257
GARMENT TESTING APPARATUS
Filed May 9, 1968   2 Sheets-Sheet 1
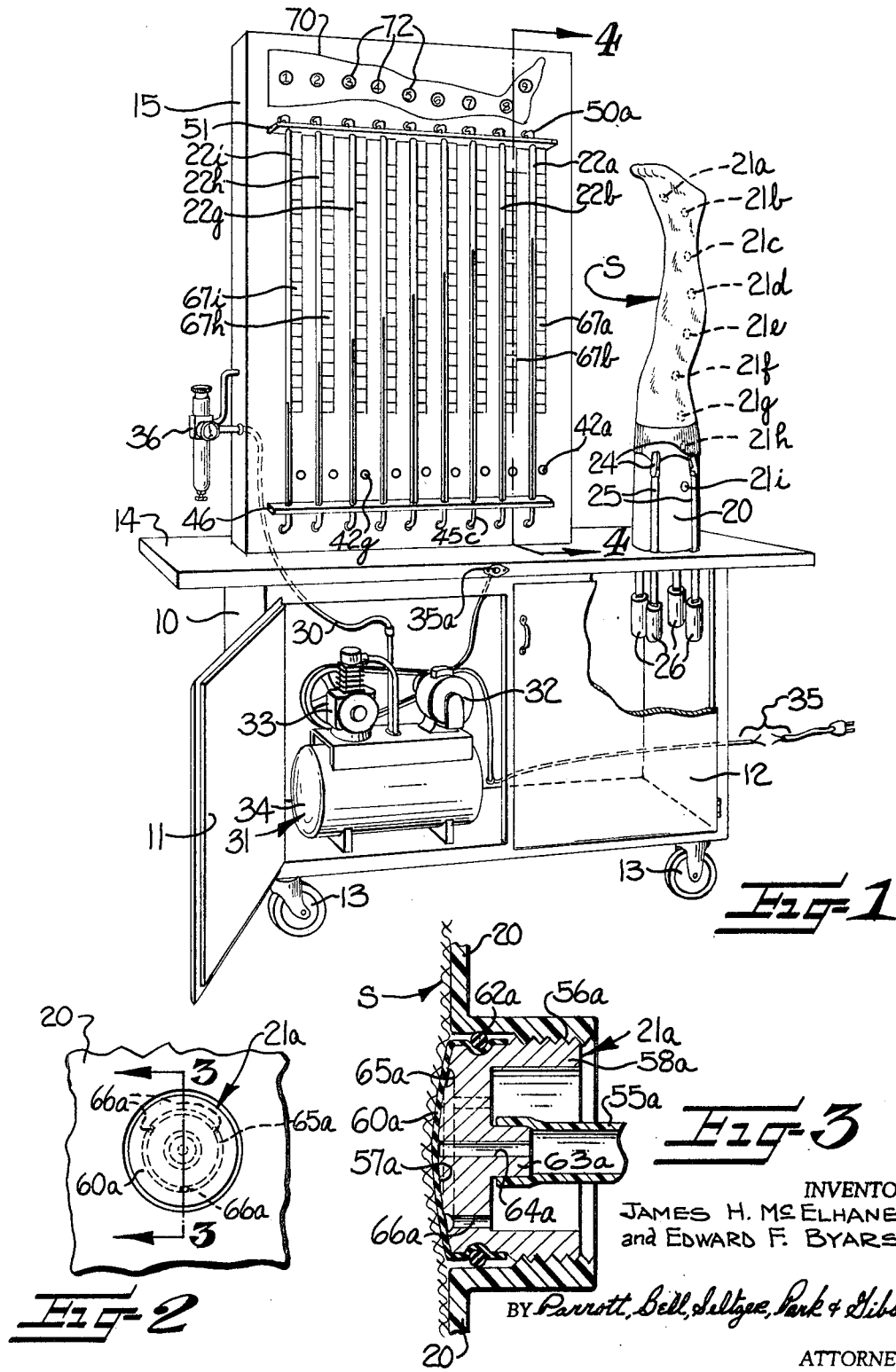
INVENTORS:
JAMES H. McELHANEY
and EDWARD F. BYARS
BY Parrott, Bell, Seltzer, Park & Gibson
ATTORNEYS

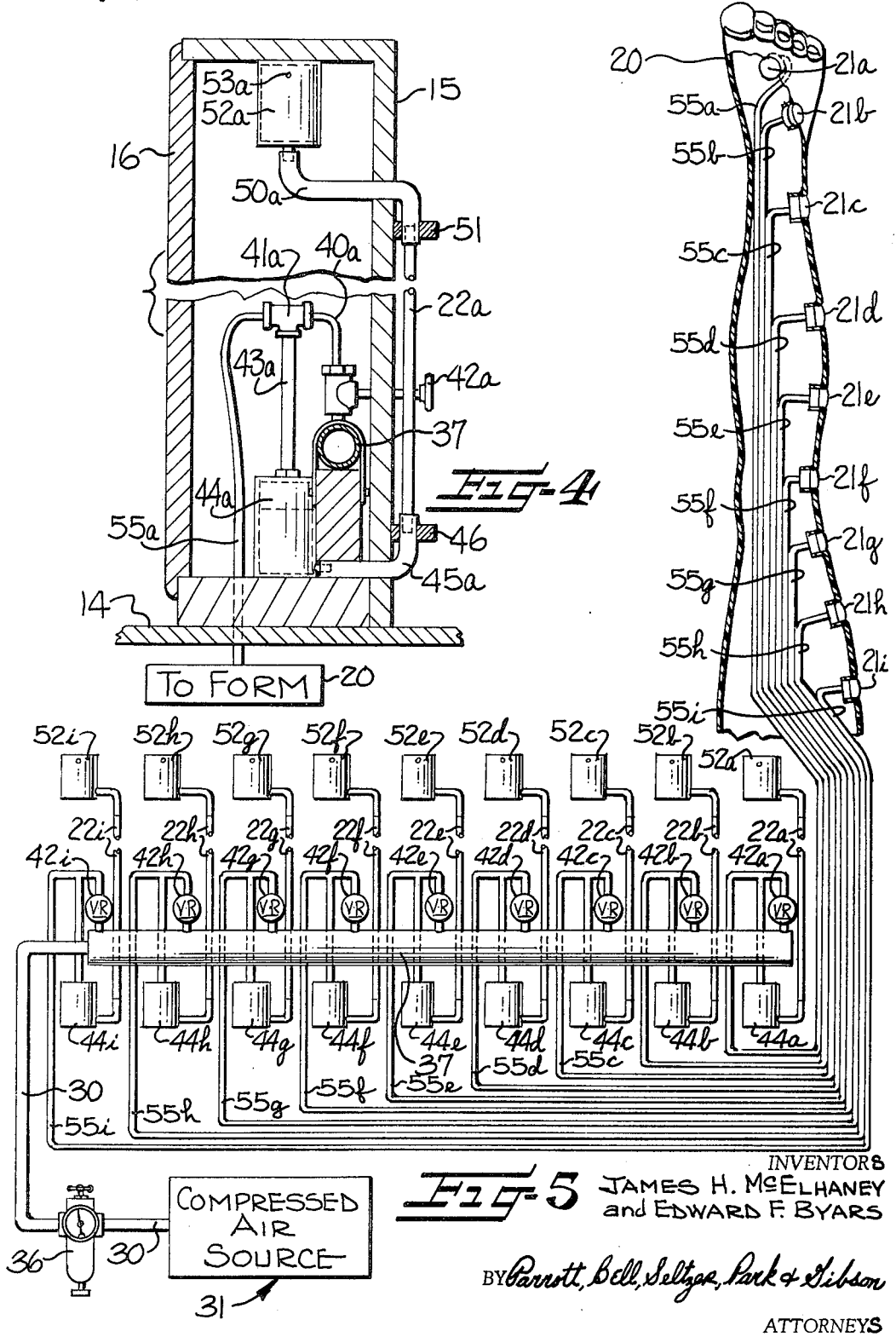

United States Patent Office 3,503,257
Patented Mar. 31, 1970

3,503,257
GARMENT TESTING APPARATUS
James H. McElhaney and Edward F. Byars, Morgantown, W. Va., assignors to Pilot Research Corporation, Valdese, N.C., a corporation of North Carolina
Filed May 9, 1968, Ser. No. 727,830
Int. Cl. G01l 1/02
U.S. Cl. 73—133          8 Claims

ABSTRACT OF THE DISCLOSURE

The relative compressive forces applied by a garment on various portions of the body are simultaneously measured by this testing apparatus. The garment is positioned on a form substantially conforming to the shape of that portion of the body on which the garment is to be worn. Liquid level type pressure gauges are supported adjacent the form and in side-by-side relationship and operatively connected to corresponding pressure sensors positioned in spaced positions on the form. The gauges provide a graphic visual indication of the relative compressive forces applied by the garment on the various portions of the form.

---

This invention relates generally to an apparatus for testing garments and more particularly to an apparatus for measuring and comparing the relative compressive forces applied on various portions of the body by an article of wearing apparel, such as support stockings and the like.

Most stretchable and retractive garments are manufactured to engage the body of the wearer with a particular compressive force. In the manufacture of certain garments, such as bathing suits, elastic bandages or limb supports and the like, it may be desirable to shape or fashion the garments so that all portions engage the body with substantially the same amount of compressive force. In the manufacture of other garments, it may be desirable for various portions of the garment to apply different degrees or amounts of compressive force on corresponding portions of the body. For example, in the case of foundation garments, such as girdles and the like, it may be desirable to have more compressive force applied in the area which engages the stomach.

In the manufacture of ladies' support stockings, it has been found desirable to knit them in such a manner as to provide a gradually decreasing compressive force or pressure from the ankle upwardly to the thigh. The usual method of testing the compressive forces of support stockings is to conduct wear tests and/or to stretch various portions of the stockings under fixed loads. By these methods, the standards are set up and maintained on a trial and error basis and even then the standard is difficult to maintain because it depends, at least in part, on the skill and accuracy of the person conducting the test.

United States Reissue Patent No. 25,046 suggests the use of a mercury manometer device, of the type normally used for measuring blood pressure, for measuring the compressive force or pressure of a support stocking against the leg of the wearer. This device includes a rubber bladder which is inflated to a predetermined degree before it is placed in a particular location between the stocking and the leg. The difference between the pressure reading of the inflated bladder before it is placed between the stocking and the leg of the wearer and the pressure reading after it is positioned between the stocking and the leg provides an indication of the amount of compressive force applied on the bladder by that particular portion of the support stocking. However, the bulge created in the stocking fabric by the inflated bladder does not provide an accurate indication of the force of the stocking against the leg. In order to measure the compressive forces applied by various portions of the stocking, it is necessary to move the badder to different locations and make separate readings, which must then be compared. These separate readings and comparisons take time and require an accurate positioning of the bladder as each stocking is tested so that the accuracy of this device is still in part dependent upon the skill of the tester.

With the foregoing in mind, it is an object of the present invention to provide a testing apparatus for simultaneously measuring and comparing the relative compressive forces applied on various portions of the body by a garment and wherein the stockings may be tested in a rapid and accurate manner.

It is another object to provide a testing apparatus wherein the compressive forces are simultaneously indicated in a graphic manner so that any variation from the desired standard is immediately apparent to the operator of the testing apparatus, without requiring any mathematical computations.

In accordance with the present invention, the apparatus includes a form having an outer configuration conforming to the shape of the article and to that portion of the body on which the article or garment is to be worn, pressure sensor devices are supported in spaced locations on the form and positioned to be engaged by the inner surface of a garment stretched onto the form, and side-by-side liquid level type pressure indicating gauges (corresponding in number to the pressure sensor devices) are operatively connected to corresponding sensor devices so that the amount of compressive force of the garment against each of the devices is simultaneously indicated on the corresponding pressure gauges whereby the measured compressive forces provide a visual indication of any variation in compressive forces between the various parts of the garment. The pressure sensors are positioned substantially flush with the surface of the form so that the compressive force of the garment is measured while the garment is in the condition it assumes when being worn.

Some of the objects of the invention having been stated, other objects will appear as the description proceeds when taken in connection with the accompanying drawings, in which:

FIGURE 1 is a perspective front view of the present testing apparatus, the illustrated embodiment being of the type particularly adapted for measuring and comparing the relative compressive forces applied by a support stocking on a standard leg form;

FIGURE 2 is an enlarged fragmentary elevational view of one of the pressure sensor means supported on the surface of the leg form;

FIGURE 3 is an enlarged vertical sectional view through the pressure sensor means shown in FIGURE 2 and being taken substantially along the line 3—3 therein;

FIGURE 4 is an enlarged vertical sectional view through the upper portion of the apparatus, being taken substantially along the line 4—4 in FIGURE 1, and with the central portion thereof broken away; and FIGURE 5 is a somewhat schematic flow diagram illustrating the interconnection of the pressure sensor means in the leg form with the corresponding pressure indicating gauges, and with the constant input air pressure supplied to the apparatus.

Referring particularly to FIGURE 1, the testing apparatus generally includes a cabinet base 10 having suitable access doors 11, 12 and preferably supported on wheels 13 so that it may be easily moved from place to place. A suitable table top 14 is supported on the upper end of the cabinet base 10 and supports the lower end of an upstanding pressure gauge support cabinet 15, the rear portion of which is provided with suitable access doors 16 (FIGURE 4) while the front portion provides a suitable pressure gauge panel.

A hollow form 20 is suitably supported at its lower end on the table top 14 and adjacent the pressure gauge support cabinet 15. The outer configuration of the form 20 conforms to the shape of the article or garment and to that portion of the body on which the garment is to be worn. In the present instance, the form 20 conforms to the shape of a human leg and is adapted to receive support stockings, such as indicated at S in FIGURE 1, thereon. Pressure sensor means broadly indicated at 21a–21i are supported in spaced positions longitudinally along the surface of the leg form 20 and are positioned to be engaged by the inner surface of the stocking S when it is drawn onto the form 20. The pressure sensor devices 21a–21i are operatively connected to corresponding pressure indicating means including manometer type liquid level gauge tubes 22a–22i.

The pressure indicating tubes 22a–22i are positioned in closely spaced side-by-side vertically disposed relationship and closely adjacent the leg form 20 to simultaneously measure the corresponding compressive forces applied against the corresponding sensing devices 21a–21i by the stocking S placed on the leg form 20. This side-by-side closely adjacent positioning of the gauge tubes provides a measurement of the amount of compressive force at each location of the stocking and the liquid levels provide a ready visual comparison of the relative compressive forces applied at each portion of the stocking. The levels of the liquid in the side-by-side tubes appear as a bar graph (FIGURE 1) so that variations from the desired or normal compressive forces may be readily detected without requiring any mathematical computations or the like.

Downward pulling force may be applied to the stocking S to maintain the same in the desired position on the form 20 by means of suitable spring clips 24, which are removably attached to the top of the stocking S and connected by lines 25 to suitable weights 26 which hang inside the cabinet base 10 (FIGURE 1). The lines 25 extend through suitable openings in the table top 14 and the spring clips 24 support the weights 26 when the spring clips are released from the stocking S.

Compressed air is supplied to a main entrance line 30 (FIGURES 1 and 5) by any suitable source of compressed air, such as an air compressor unit 31 (FIGURE 1), which includes an electric motor 32, a compressor unit 33, and a storage tank 34. The compressor unit 31 is suitably supported in the cabinet base 10 and the electric motor 32 may be suitably connected to any suitable source of electrical energy as by an electric cord 35. A switch 35a is supported on the table top 14 and is suitably connected to the motor 32. If desired, the compressor unit 31 may be omitted and the main air entrance line 30 can be connected directly to the compressed air lines usually found in hosiery mills and the like.

A combination pressure regulator and filter unit 36 is provided in the main entrance line 30 so that the amount of compressed air entering the testing apparatus may be regulated. The other end of the main entrance line 30 is connected to one end of a manifold tube 37 which extends along in a horizontal position, behind the front panel of the pressure gauge support cabinet 15 (FIGURE 4). The pressure sensor devices 21a–21i, the corresponding liquid level pressure gauges 22a–22i, and the connections are identical. Only the parts of the sensor 21a and the gauge 22a will be described in detail and the corresponding parts of the other sensors and gauges will bear like reference characters, with the corresponding suffixes added.

A line 40a extends from the manifold 37 (FIGURE 4) to a T-connection 41a and a pressure regulator valve 42a is interposed in the line 40a to regulate the pressure of the air entering the line 40a from the manifold 37. A line 43a is connected at its upper end to the T-connection 41a and at its lower end to the upper end of a fluid reservoir 44a. A flexible tube 45a is suitably connected at one end to the lower end of the reservoir 44a and extends through the front panel of the gauge support cabinet 15. The other end of the tube 45a is supported in a lower support bar or bracket 46 and is suitably connected to the lower end of the liquid gauge tube 22a. The upper end of the tube 22a is connected to the lower end of a flexible tube 50a which is supported in an upper support bracket 51. The tube 50a extends through the front panel of the gauge support cabinet 15 and its upper end is suitably connected to the lower end of an overflow reservoir 52a. The upper end of the overflow reservoir 52a is provided with suitable air escape openings 53a.

One end of an air line 55a is suitably connected to the T-connection 41a and its other end extends up into the hollow leg form 20 and is suitably connected to the sensor device 21a. The sensor device 21a includes an air nozzle 58a (FIGURE 3) which is supported in the leg form 20 by any suitable means, such as by a screw thread connection 56a. The air nozzle 58a is circular and has a substantially smooth convex outer face 57a which is substantially flush with the outer face of the leg form 20 and is provided with a resilient cover in the form of a rubber film diaphragm 60a that is normally in engagement with the outer face 57a.

The rubber diaphragm 60a is held in slightly stretched condition on the outer face 57a by a resilient O-ring 62a which surrounds the air nozzle and forces the outer edge portion of the diaphragm 62a into an annular groove in the peripheral surface of the air nozzle. The end of the tube 55a (FIGURE 3) is suitably connected to a central boss portion 63a having an air entry opening in the form of a bore 64a extending to and communicating with the outer face portion 57a. A semi-circular annular groove 65a (FIGURES 2 and 3) is formed in the face 57a and surrounds the bore 64a. Air escape openings in the form of spaced apart bores 66a communicatively connect the groove 65a with the atmosphere on the inside of the hollow leg form 20.

As air under pressure enters the tube 55a and bore 64a, the diaphragm 60a is forced outwardly away from the face 57a and permits air to pass into the groove 65a and escape through the bores 66a. When the stocking S is not positioned on the leg form 20 and pressing against the diaphragm 60a, the diaphragm 60a permits a certain proportion of the air pressure to escape so that a predetermined pressure is applied against the upper surface of the liquid in the reservoir 44a to force the liquid up to a certain level in the gauge tube 22a. The air pressure valve 42a is then adjusted so that the level of the liquid in the gauge tube 22a is at the zero setting of a scale 67a positioned adjacent the gauge 22a. The scale 67a is preferably marked to indicate the compressive force of the stocking in milometers of mercury and may extend from zero to forty-six. Before stockings are to be tested on the leg form 20, the gauges 22a–22i are each adjusted to the zero position by means of the corresponding valves 42a–42i.

When a stocking S is placed on the leg form 20, the compressive force of the stocking against the diaphragm 60a will reduce the amount of air which escapes from the air nozzle 21a and thereby increase the air pressure against the liquid in the corresponding reservoir 44a to thereby raise the level of the liquid in the corresponding gauge tube 22a. Thus, the level of the liquid in the tubes 22a–22i depends upon the corresponding increase or reduction in the amount of air which escapes through the corresponding sensor device 21a–21i. Also, the amount of compressive force applied by the stocking against the sensor devices 21a–21i determines the amount of air pressure which will escape therefrom and the amount of air pressure on the liquid in the corresponding reservoir to thereby control the liquid level in the corresponding pressure gauge tube.

Should the compressive force of the stocking on the diaphragm be so great that no air can escape, all the air pressure would then be directed into the reservoir to force the liquid up the gauge tube and into the corresponding overflow reservoir 52a–52i. The overflow reservoir is of sufficient volume to contain substantially all the liquid in the system so that it will not be lost should all the air pressure be directed into the supply reservoir.

A silhouette plate 70 is attached to the upper portion of the pressure gauge support cabinet 15 and above the corresponding pressure gauge tubes 22a–22i. The outer edge of the plate corresponds to the outline of the leg form 20 and the plate is provided with numbered location markers 72 which correspond to the placement of the sensor devices 21a–21i on the leg form 20. Thus, the pressure indications on the gauge tubes may be easily orientated with the locations of the corresponding pressure sensors on the leg form, where the compressive force measurements are being taken.

In order to insure that successive stockings are uniformly positioned on the form 20, the boarded stocking is preferably laid out in flat form and marked by means of a suitable template or gauge. These marks indicate the proper positioning of the portions of the stocking over the corresponding sensor devices when the stocking is pulled onto the leg form and adjusted so that the marked points are positioned over the sensors. As shown in FIGURE 1, nine pressure sensing devices are located on the form and the welt of the stocking S does not come down far enough to cover the lowermost of these sensor devices so that the liquid level of the corresponding gauge tube 22i remains on the zero mark of the scale 67i. However, it is to be understood that this lower sensor 21i would be covered by a longer stocking.

As has been mentioned, in support stockings, it is generally agreed that the compressive force should gradually decrease up the leg of the wearer and, as shown in FIGURE 1, the liquid levels in the gauge tubes 22a–22h illustrate this gradual reduction of compressive force. The side-by-side arrangement of the gauge tubes provides a bar graph type of indication of the comparative compressive forces so that any irregularities may be easily detected. This visual comparison may also be used to compare compressive forces in a garment of the type where the compressive forces in all parts are to be equal, or to compare the compressive forces in a garment where one or more portions has a higher compressive force than the other portions. Of course, the actual compressive force in any portion of the garment can be read from the scale adjacent the corresponding gauge tube and recorded, if desired. The gauge tubes 22a–21i and/or the corresponding scales 67a–67i may be marked with color bands or lines to indicate the desired standard to be maintained in the garments being tested. Then, the operator can quickly check to see if the liquid levels correspond with the marked standards.

As has been pointed out, the air nozzle 58a (FIGURE 3) is circular and the pressure sensor 21a is relatively small, on the order of about 7/8 of an inch in diameter. The curve of the convex outer face 57a of the air nozzle 58a is very shallow so that the outer surface of the resilient cover 60a is substantially flush with the outer surface of the form 20. Thus, the position of the stocking S in engagement with the pressure sensor is not distorted and the present apparatus gives a true indication of the compressive force applied by the stocking since it is maintained in substantially the same condition it assumes on the leg of the wearer.

In the drawings and specification there has been set forth a preferred embodiment of the invention, and although specific terms are employed, they are used in a generic and descriptive sense only and not for purposes of limitation, the scope of the invention being defined in the claims.

We claim:
1. An apparatus for measuring and comparing the relative compressive forces applied on various portions of the body by an article of wearing apparel, said apparatus comprising:
 (a) a form having an outer configuration conforming to the shape of the article and to that portion of the body on which the article is to be worn,
 (b) pressure sensor means supported in spaced locations on the surface of said form and positioned to be engaged by the inner surface of an article positioned on said form, sad pressure sensor means each including an outer surface supported substantially flush with the outer surface of said form so that the corresponding portions of the article in engagement with said outer surfaces remain in substantially undistorted condition, and
 (c) pressure indicating means operatively connected to each of said pressure sensor means, said pressure indicating means each being operable by a corresponding one of said pressure sensor means to simultaneously indicate the corresponding compressive forces applied against said form and said sensor means by the article on said form.

2. An apparatus according to claim 1 wherein said pressure indicating means are positioned adjacent said form and are supported in side-by-side relation to each other so that the indicated compressive forces may be readily compared.

3. An apparatus for measuring and comparing the relative compressive forces applied on various portions of the body by an article of wearing apparel, said apparatus comprising:
 (a) a form having an outer configuration conforming to the shape of the article and to that portion of the body on which the article is to be worn,
 (b) pressure sensor means supported in spaced locations on the surface of said form and positioned to be engaged by the inner surfaces of an article positioned on said form, said pressure sensor means comprising:
  (1) an air nozzle having an air entry opening and an air escape opening,
  (2) an air pressure line connected at one end to said air entry opening and the other end being communicatively connected to an air pressure source, and
  (3) a resilient cover having an inner surface extending over said air entry opening and said air escape opening, and having an outer surface adapted to be engaged by the inner surface of an article placed on said form,
 (c) pressure indicating means operatively connected to each of said pressure sensor means, said pressure indicating means each being operable by a corresponding one of said pressure sensor means to simultanaeously indicate the corresponding compressive forces applied against said form and said sensor means by the article on said form, each of said pressure indicating means comprising:
  (1) a manometer gauge supported in a vertical position,
  (2) a liquid reservoir communicatively connected to the lower end of said manometer gauge, and
  (3) an air line connecting said liquid reservoir to a medial portion of said air pressure line whereby variations in the amount of air escaping through said air nozzle correspondingly varies the amount of air pressure on the liquid in said reservoir to thereby vary the height of the liquid in the manometer gauge.

4. An apparatus according to claim 3 wherein said air nozzle is circular and has a convex outer face, said air entry opening being positioned in the center of said outer face, said air escape opening including a semi-circular groove in said outer face and surrounding said air entry opening, and spaced apart bores extending through said air nozzle and communicatively connecting said semi-circular groove with the atmosphere.

5. An apparatus according to claim 4 wherein said resilient cover comprises a circular sheet of film rubber material, a resilient ring surrounding said air nozzle and maintaining said film rubber in stretched condition against the outer face of said air nozzle, and said outer surface of said resilient cover being substantially flush with the outer surface of said form so that the portion of the article in engagement with said pressure sensor remains in substantially undistorted condition.

6. An apparatus according to claim 3 including an air pressure manifold, and wherein said other end of each of said air pressure lines is connected to said manifold.

7. An apparatus according to claim 6 including an air pressure valve in each of said air pressure lines and adjacent said manifold, said air pressure valves being manually operable to control the amount of air pressure directed into each of said reservoirs from said manifold and to thereby provide means to equalize the liquid levels in each of said manometer gauges prior to a testing operation.

8. An apparatus for measuring and comparing the relative compressive forces applied on various portions of the leg by a support stocking, said apparatus comprising:

(a) a leg form having the outer configuration of the average human leg and being substantially hollow, (b) pressure sensor devices supported in spaced positions longitudinally of said leg form, and positioned to be engaged by the inner surface of a support stocking positioned on said form, said pressure sensor devices each including an outer surface supported substantially flush with the outer surface of said leg form so that the corresponding portions of the stocking in engagement with said outer surfaces remain in substantially undistorted condition, and (c) a manometer type liquid level pressure indicating gauge operatively connected to each of said pressure devices and being operable thereby to simultaneously indicate the corresponding compressive forces applied against said corresponding portions of said leg form by the support stocking on said form, said manometer gauges being positioned adjacent said form and in side-by-side relationship so that the registered compressive forces reflected by the liquid levels provide a graphic visual comparison.

References Cited

UNITED STATES PATENTS

| | | | |
|---|---|---|---|
| 2,369,661 | 2/1945 | Dangelmajer | 73—159 |
| 2,558,805 | 7/1951 | Yaglou | 73—172 |
| 2,675,703 | 4/1954 | Hemmerich | 73—159 |

S. CLEMENT SWISHER, Primary Examiner

U.S. Cl. X.R.

73—159